United States Patent [19]
Van Aken et al.

[11] Patent Number: 5,828,399
[45] Date of Patent: Oct. 27, 1998

[54] IMAGESETTER WITH ROTATING INTERNAL DRUM

[75] Inventors: Luc Van Aken, Kuringen; Bert Vackier, 's-Gravenwezel; Karel Van den Eynde, Deurne, all of Belgium

[73] Assignee: Agfa-Gevaert, Mortsel, Belgium

[21] Appl. No.: 733,754

[22] Filed: Oct. 18, 1996

Related U.S. Application Data

[60] Provisional application No. 60/009,576 Jan. 3, 1996.

[30] Foreign Application Priority Data

Nov. 13, 1995 [EP] European Pat. Off. ............. 95203079

[51] Int. Cl.$^6$ ........................................... B41J 2/47
[52] U.S. Cl. ........................................ 347/153; 347/262
[58] Field of Search .................................. 347/262, 264, 347/263, 153, 139

[56] References Cited

U.S. PATENT DOCUMENTS

| | | | |
|---|---|---|---|
| 4,260,998 | 4/1981 | Fukui | 346/108 |
| 4,334,770 | 6/1982 | Landsman | 347/264 |
| 4,525,828 | 7/1985 | Higashiyama et al. | 347/242 |
| 4,575,398 | 3/1986 | Tschishow | 156/99 |
| 5,026,045 | 6/1991 | Wirz et al. | 271/277 |
| 5,317,424 | 5/1994 | Aotani | 358/491 |
| 5,404,187 | 4/1995 | Sterflinger | 347/263 |

FOREIGN PATENT DOCUMENTS

| | | |
|---|---|---|
| 4313111 | 4/1994 | Germany . |
| WO9314441 | 7/1993 | WIPO . |

*Primary Examiner*—Mark J. Reinhart
*Attorney, Agent, or Firm*—Baker & Botts, L.L.P.

[57] ABSTRACT

Rotating drum (10) imagesetter for producing an image on a flexible sheet of radiation-sensitive material, wherein a sheet (20) is held on the inside surface of the drum (14), and the exposure means (25) his located inside the drum.

11 Claims, 8 Drawing Sheets

IMAGESETTER WITH ROTATING INTERNAL DRUM

DESCRIPTION

BACKGROUND OF THE INVENTION

This is a provisional application Ser. No. 60/009,576 filed Jan. 3, 1996.

1. Field of the Invention

The present invention relates to a rotating drum imagesetter for producing an image on a flexible sheet of radiation-sensitive material.

2. Description of the Prior Art

The art of drum-like imagesetters comprises two types of apparatus.

First, the so-called internal drum recorders in which a flexible light-sensitive sheet is held against the inside surface of a stationary drum and line-wise exposed by means of a rotating (penta) prism which deflects an axial laser beam at right angles onto the surface of the sheet. The mirror and its driving motor are mounted on a carriage which can travel axially through the drum thereby to cover the exposure width (i.e. the dimension parallel to the drum axis) of the apparatus.

Disadvantages of this type of apparatus are as follows:

since the laser beam follows the centre line of the internal drum, one has to be careful with the generation of stray light;

further, a limited number only of beams can be used simultaneously because of intersecting zones and changing optical path lengths, so that a limited speed of exposure results, especially if high power is required, such as in heat mode systems.

One example of inchlike recorder is disclosed in U.S. Pat. No. 4,260,998.

A second class of apparatus are external drum recorders in which a light-sensitive sheet is fitted to the outside surface of a rotating drum, and the exposure occurs by a light source travelling axially along the outer periphery of the drum. These apparatus show the following disadvantages:

their rotational speed is limited (typically 2500 rpm) because of the high inertia of the drum;

the duty cycle depends on the length (i.e. the dimension normal to the drum axis) of the light-sensitive sheets, in a way comparable with internal drum recorders; and finally, the construction is heavy and sturdy, leading to expensive equipment.

One example of this class of apparatus is disclosed in DE-43 13 111 A1.

SUMMARY OF THE INVENTION

OBJECTS OF THE INVENTION

It is one object of the present invention to provide a light-weight imagesetter which is of the internal recording type, and which does not require a rotating exposure source.

A further object of the invention is a rotating drum-type image recorder with a limited inertia so that the rotational speed can be higher than in conventional apparatus (typically up to 2500 rpm). Limited inertia allows a less heavy and sturdy machine construction and leads consequently to cheaper equipment.

STATEMENT OF THE INVENTION

In accordance with the present invention, a rotating drum imagesetter comprising sheet retaining means arranged for rotation around a central axis and for retaining a flexible sheet of radiation sensitive material in cylindrically curved condition, and exposure means for imagewise exposing a sheet held and rotated by said sheet retaining means is characterised thereby that said exposure means is arranged inside said drum and that said drum is arranged for holding said sheet on its inside surface, thereby to carry out internal exposure of said sheet.

The main advantage of the present invention resides in the fact that smaller holding forces for the light-sensitive sheet than in known external drum recorders can be used since now centrifugal forces cause a radially outward bias of each elementary sheet area. Thus the construction of the drum can be lighter than in known apparatus operating with external recording.

Since the exposure means is non-rotating, it can be mounted closer to the surface of the radiation-sensitive material than in known internal drum recorders in which the axis of the rotating exposure beam must coincide with the drum axis in order to keep the rotating beam length constant. Such shorter distance raises less problems with the depth of focus of the exposure source, whereas also stray radiation is less.

It is further possible to replace a solid drum by retaining means for retaining a sheet in a substantially cylindrical configuration, said retaining means being arranged for entering in supporting contact with local areas only of the sheet. This latter construction can be called a "virtual drum". It has the great advantage of a very reduced rotating mass.

If a virtual drum construction is used, such construction can have an adjustable diameter.

A first advantage of such construction is that it allows a higher duty cycle to be used. Typical duty cycles are limited. A common maximum of exposure period versus revolution period of the exposure beam is approximately 70%. This ratio changes with the film sheet length.

A second advantage of such construction is that allows easier loading and unloading of a drum. Both advantages are discussed in detail and claimed in our co-pending application entitled "Drum type imagesetter with variable diameter" filed on even day herewith.

The means for image-wise exposure of a sheet can be of the active or passive type. With active means we mean LED's (light-emitting diodes), conventional and high power lasers, and the like. With passive means we mean light valves capable of interrupting or modulating radiation from one or a plurality of sources, one or a plurality of small mirrors that can be deflected to control the amount of radiation reflected from a suitable source onto the sheet, etc.

The term "radiation-sensitive" stands for light- as well as heat-sensitive recording material. A suitable material for heat-mode recording has been disclosed in EP 93 201 858.3.

BRIEF DESCRIPTION OF THE DRAWINGS

The invention will be described hereinafter by way of example with reference to the accompanying drawings, wherein.

DETAILED DESCRIPTION OF THE INVENTION

Figure 1:
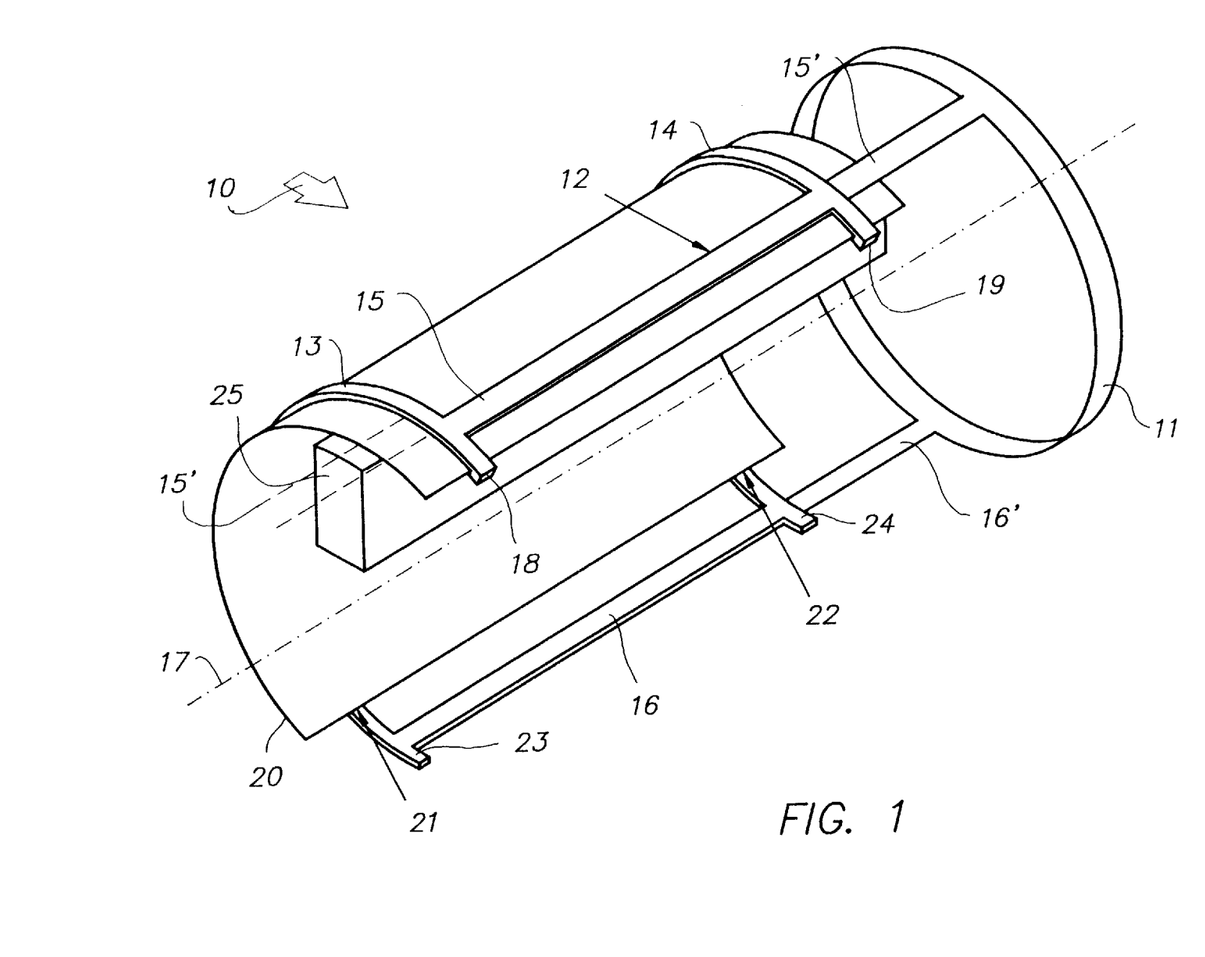
FIG. 1 is an isometric diagrammatic view illustrating principally one embodiment of an imagesetter according to the present invention.

Referring to FIG. 1, there is shown a diagrammatic view of one embodiment of a rotating drum imagesetter according to the invention.

The apparatus, indicated generally by numeral 10 comprises a light weight structure 12, e.g. made from cast and machined aluminium, with two cylindrically curved sheet retainers in the form of open rings 13, 14 interconnected by a plurality of bars, such as bars 15, 16 shown. The bars have at either end extensions 15', 16' etc., interconnected by a ring 11 (shown at the right-hand side only) which offers the required mechanical stability of the cage. The virtual drum thus formed is rotatable about its axis 17 by bearing means not shown. Rings 13, 14 angularly extend over approximately 270° and are provided at one end with stoppers 18, 19. An aluminium offset printing plate 20 is fed tangentially into the drum by pressure exerted e.g. near its trailing edge, as indicated by arrows 21, 22 until the plate abuts with its leading edge against stoppers 18, 19. At that moment the trailing edge of the plate can be kept under a slight bias by any means known in the art, or the position of the trailing edge of the plate can be locked against sliding backwards by appropriate locks or the like. In any way, firm biasing of the plate is not required since rotation of the virtual drum will hold the plate in firm contact with the inward bearing surfaces 23, 24 of rings 13, 14 so that the plate gets a cylindrical curvature.

The described structure as well as the other parts of the apparatus are mounted within a lighttight housing so that the imagewise exposure of the plate can occur in daylight conditions.

Inside the virtual drum there is provided a stationary linear multi-element exposure head 25. The head comprises a multiplicity of LED's with associated driving circuits and appropriate focussing means, e.g. in the form of a Selfoc (Tradename), for focussing the image of the LED's on the innerside surface of the aluminium plate.

A suitable printing head with two staggered rows of LED's offering a high resolution has been disclosed in U.S. Pat. No. 4,536,778.

It will be clear that, as distinct from conventional internal drum scanners, the image in the inventive apparatus is scanned in one direction only, viz. in the direction normal to the axis of the drum. The image formation parallel to the axis requires no scanning since all the image points in this direction are present on the exposure head.

Exposure of the plate within the virtual drum can occur within one revolution of the drum, but depending on the sensitivity of the plate and the power of the exposure sources, the exposure can occur over a plurality of drum revolutions. The apparatus comprises in such case synchronisation means for starting every subsequent exposure in timed relation so that successive images perfectly coincide.

The rotational speed of the described drum can be high, and acceleration and deceleration periods can be short, because of the reduced mass of the rotating parts.

Figure 2A:
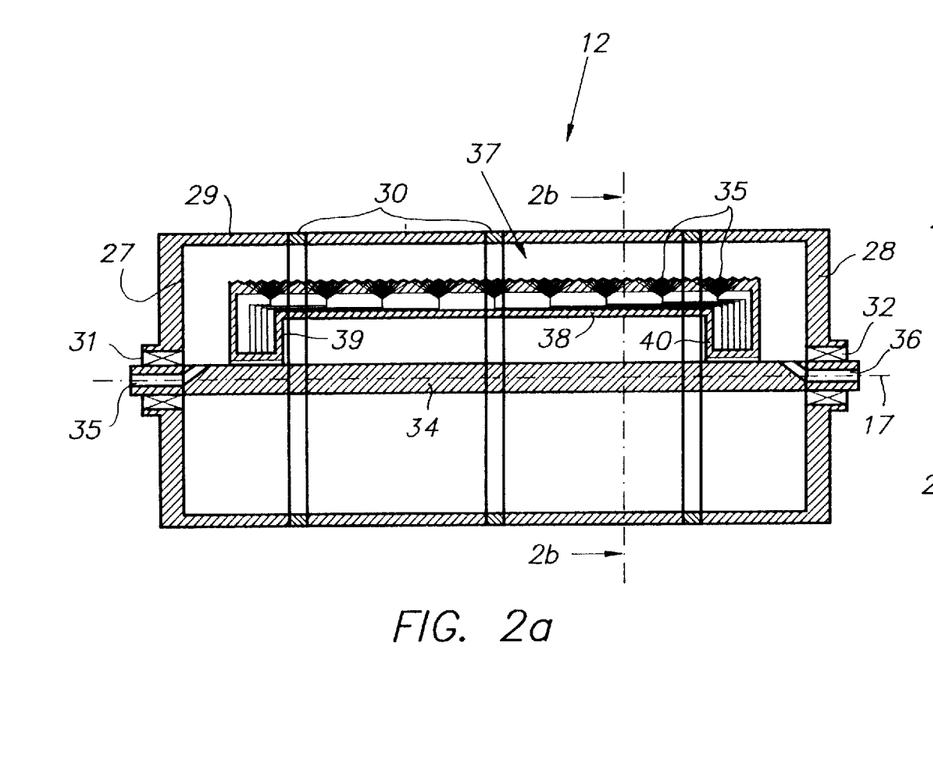
FIGS. 2a and 2b show in more detail an embodiment of an imagesetter according to the invention.
Figure 2B:
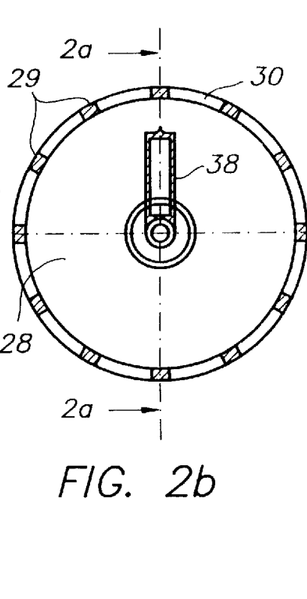

FIGS. 2a and 2b illustrate in greater detail the embodiment of FIG. 1.

Virtual drum 12 is a cage comprising two axially spaced flanges 27, 28 forming one unit with bars 29 spaced at equal angular intervals. The drum can be made from aluminium or another lightweigth metal, or from a suitable high-strength and dimensionally stable composite material. The bars can run parallel to axis 17 of the drum as shown in the figure, but can also be slightly helically twisted thereby to provide an improved circular support for a sheet inserted in the drum. The bars have a concave surface at their inside with a radius larger than that of the virtual drum. The drum can have three axially spaced rings 30 for improved cylindrical support of the sheet.

Drum 12 is journalled by means of bearings 31, 32 on a stationary shaft 34. One of the flanges can be provided with a pulley or other driving means for coupling the drum to a driving motor (not shown). Shaft 34 has passages 35, 36 for electrical connection of a LED exposure head 37 that is mounted within a housing 38 fitted with two feet 39, 40 to shaft 34.

The LED head comprises a plurality of groups 35 of LED arrays that together cover the complete exposure width of the drum. More details about a suitable LED head can be found in the art, e.g. in U.S. Pat. No. 4,536,778 mentioned hereinbefore.

Figure 3A:
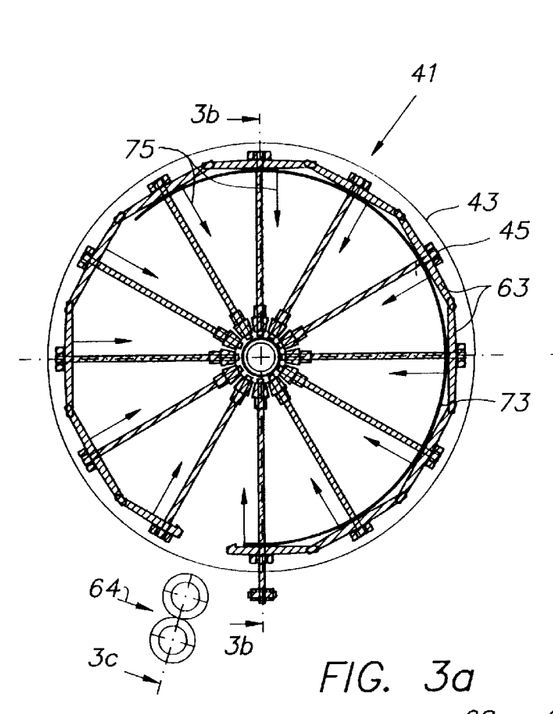
FIGS. 3a, 3b and 3c show an embodiment of an adjustable imagesetter according to the invention.
Figure 3B:
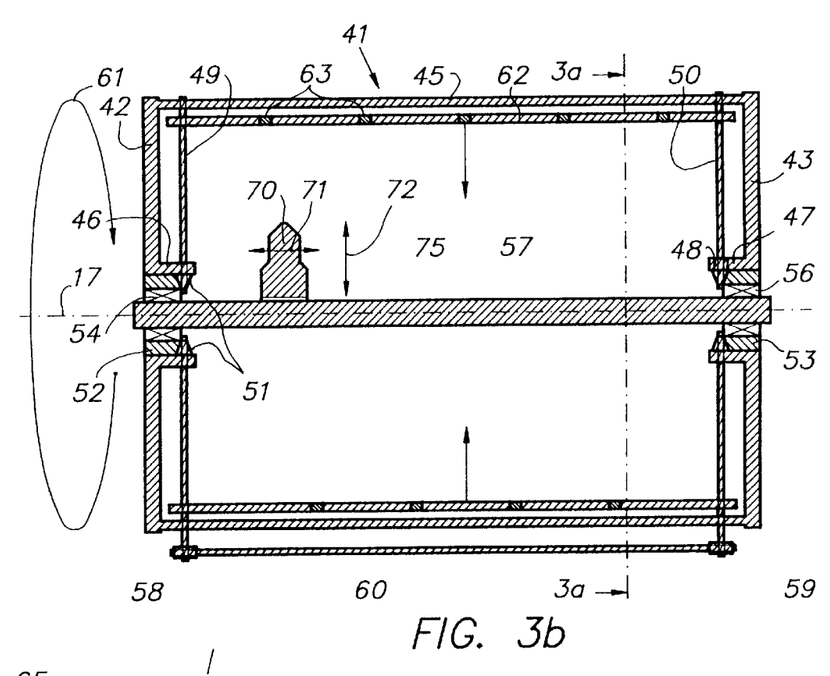
Figure 3C:
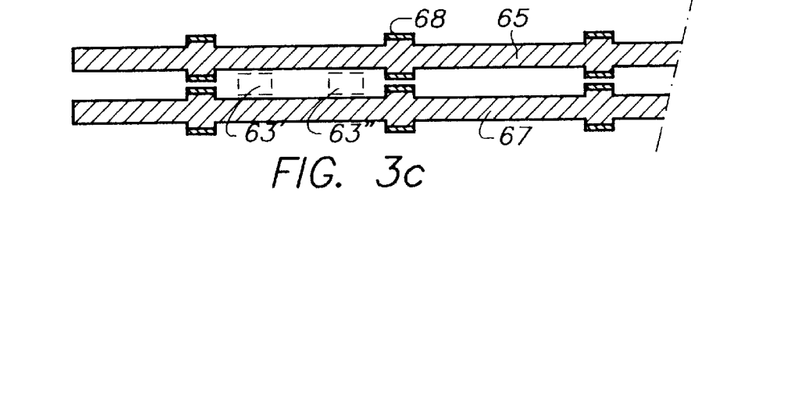

FIGS. 3a to 3c show an embodiment of a rotating internal drum imagesetter according to the invention having an adjustable diameter.

Drum 41 is a cage-like construction formed by two axially spaced circular flanges 42, 43 rigidly interconnected by parallel bars 45. The flanges have an inside hub 46, 47 with angularly spaced radial bores 48 forming with corresponding bores in bars 45 slide bearings for the rotational bearing of screw-threaded radial shafts 49, 50. The inside ends of the shafts have a conical pinion 51 engaging a crown wheels 52, 53 rotatably journalled in corresponding hubs 46, 47. The crown wheels are rotatably journalled by means of roller bearings 54, 56 on a stationary shaft 57. One shaft of each of series 49, 50 bears a gear wheel 58, 59, a timing belt 60 or the like coupling both gears to each other. Shaft 57 is supported in the light-tight housing of the apparatus and one of flanges 42, 43 can be provided with a pulley, a gear or the like for coupling the drum to a suitable driving motor so that the drum can be rotated as indicated by arrow 61.

The apparatus comprises a number of sheet-supporting bars 62, twelf in the present example, the ends of which are in screw-threaded engagement with radial shafts 49, 50. Each bar 62 has a number of cross bars in the form of fingers 63 extending at a right angle on both sides thereof, the fingers of adjacent bars 62 being axially shifted, as shown for the upper and lower bar in FIG. 2b, so that they interengage each other. The purpose of the interengaging fingers is to define an uninterrupted peripheral guiding path for the sheet as it is tangentially loaded into the drum. The fingers can be straigth as shown, but can also be curved, the radius of curvature of their inside surfaces being larger than that of the largest diameter of the drum.

The apparatus finally comprises a sheet feeding roller pair 64 the two rollers 65 and 67 of which, see FIG. 3c which is a cross-section on line 3c—3c of FIG. 3b, have a crenelated profile, the larger diameter sections having a resilient covering 68 for driving engagement with the sheet surface. At one position there have been shown the interengaging fingers 63' and 63" of opposed bars 62. This construction will be further explained with reference to FIGS. 4a to 4f hereinafter.

Finally, the apparatus comprises an exposure head 70 which is mounted for translation on shaft 57 as indicated by arrow 71, and which is provided with focussing means for focussing, see the arrow 72, its radiation beam onto a sheet in the drum.

Exposure head 70 is moved by suitable driving means, and its electrical connections are passed through shaft 57 for outside connection. The head can comprise a single radiation source or an elongated array of adjacent sources running parallel to the drum. In operation of the imagesetter, a sheet 73 within the drum is helically exposed as the drum rotates and the exposure head axially moves from one end to the other of the drum.

Rotation of the drum causes the sheet to be firmly applied against supporting fingers 63 by centrifugal forces, and as a consequence of its intrinsic stiffness, aluminium plate 73 assumes a cylindrical shape.

The duty cycle of the illustrated example is limited since, as shown, the sheet occupies approximately 225 angular degrees only of the drum. However, this imagesetter has a variable diameter, and by appropriate rotation of belt 60, e.g. through a small electric motor with reduction gear, radial shafts 49, 50 are rotated synchronously whereby bars 62 are approached towards each other, as shown by arrows 75. In that way a situation can be obtained in which the sheet covers approximately 325 angular degrees of the drum.

A suitable method of loading of the apparatus is now described in detail with reference to FIGS. 4a to 4f.

Figure 4A:
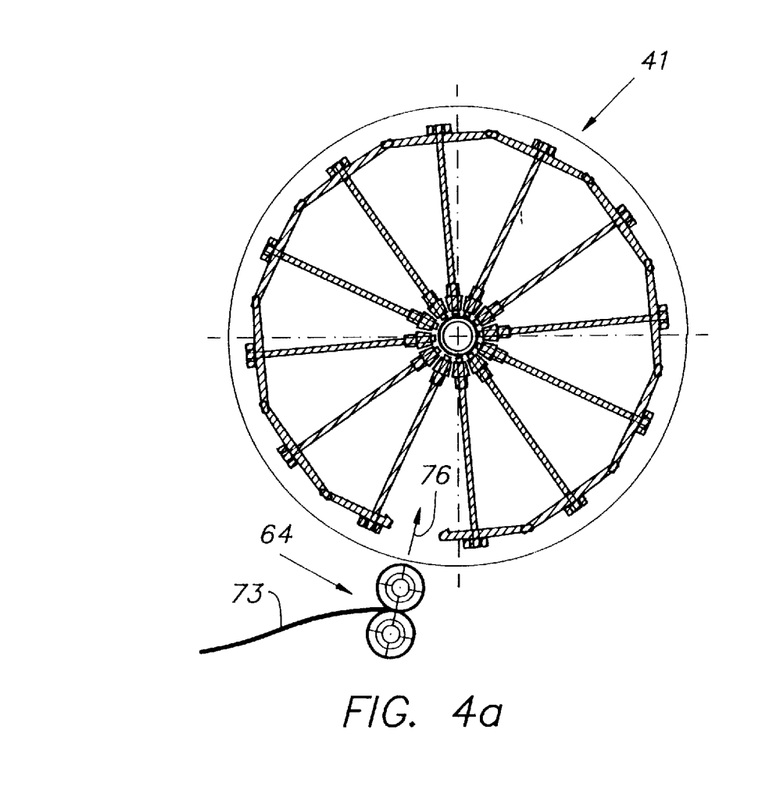
FIGS. 4a to 4f show one embodiment of a method for loading a sheet in an imagesetter according to FIGS. 3a and 3b.
Figure 4B:
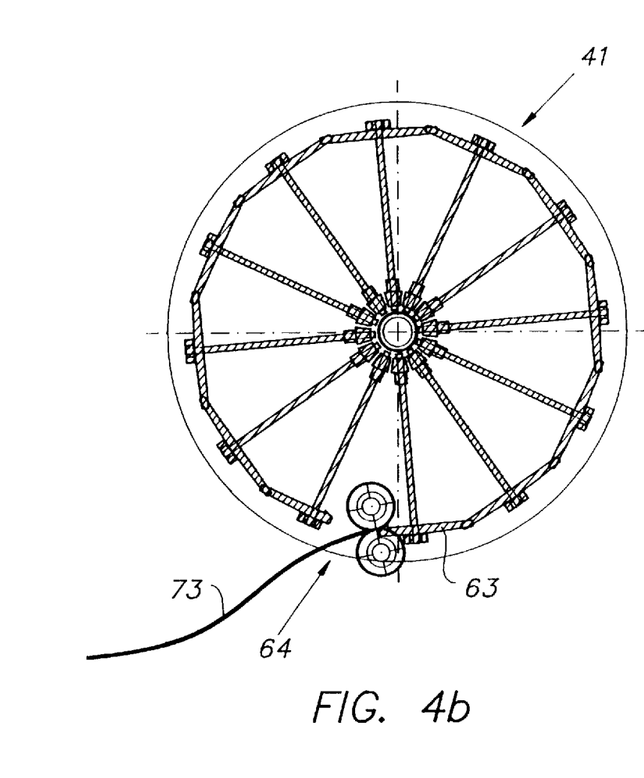

Drum 41 being in an angular position as shown in FIG. 4a, feed roller pair 64 is rotated until the leading end of sheet 73 is gripped in the nip of its rollers. The rollerpair which is bodily displaceable as shown by arrow 76 in dashed lines is next swung upwardly, see FIG. 4b, whereby the leading end of the sheet becomes located inside the drum. Fingers 63 do not interfere with the roller movement since the smaller sections of the rollers provide space for the fingers, see FIG. 3c.

Figure 4C:
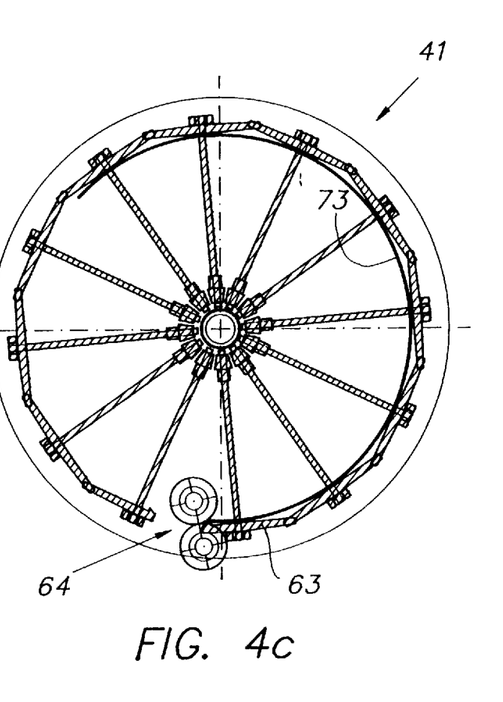
Figure 4D:
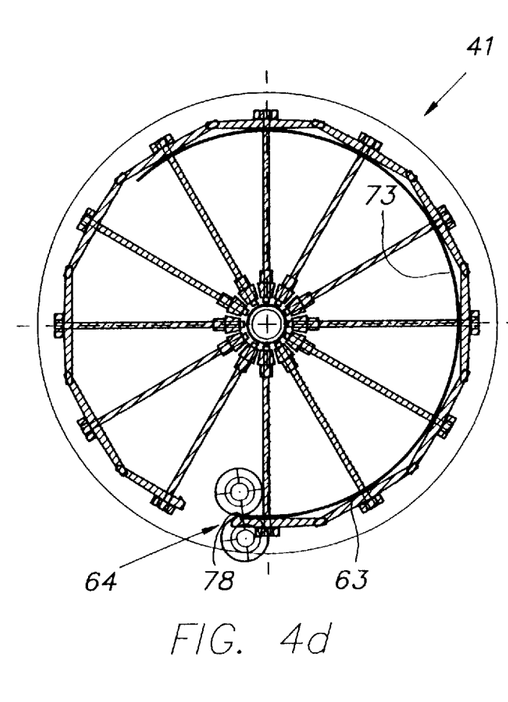

Next, rollerpair 64 is driven to introduce the sheet almost completely in the drum, see FIG. 4c. Then drum 41 is slightly angularly rotated in backward direction, see FIG. 4d, whereby the trailing end of the sheet passes beyond stop 78 formed by a hook-like extension on each of fingers 63 at one end of the drum opening.

Figure 4E:
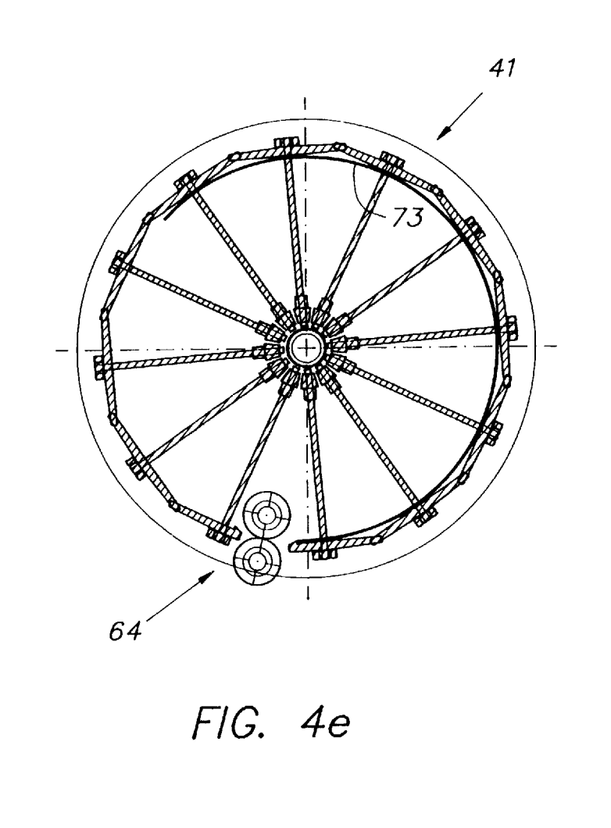
Figure 4F:
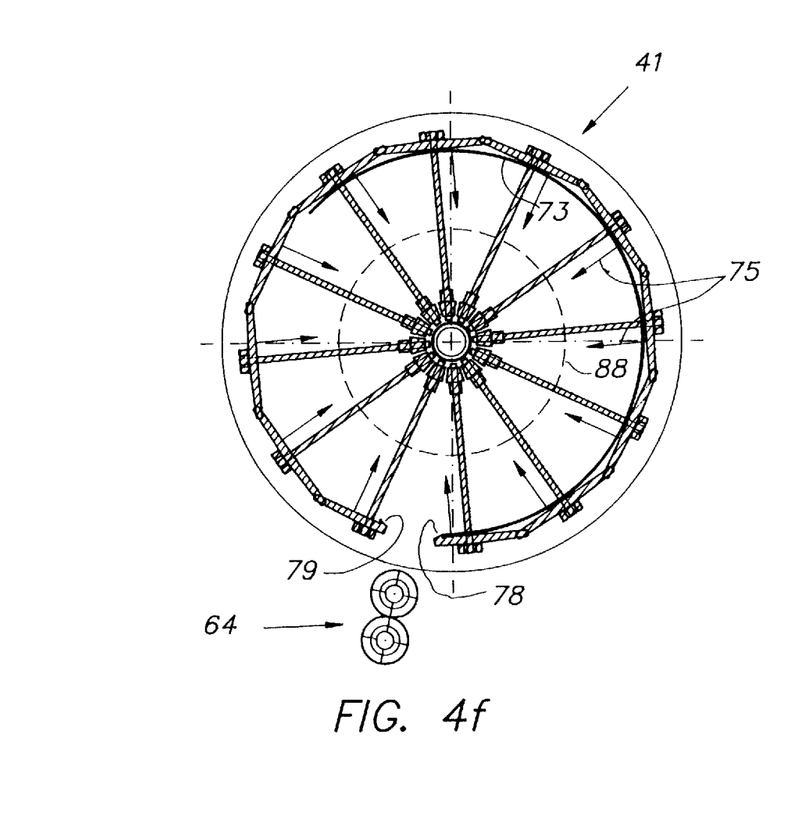

Next drum 41 is rotated back into its start position, see FIG. 4e, so that rollerpair 64 can be withdrawn into its original position. The diameter adjustment mechanism is now actuated, see the arrows 75 in FIG. 4f, whereby the drum diameter can be reduced until the leading and trailing sheet edges become clamped between end stops 78, 79 being located on a diameter 88 shown in broken lines. It will be understood that the focussing means of the exposure head have to be adjusted in accordance with the distance to the radiation sensitive sheet. Therefore it is interesting to use auto-focussing means.

Figure 5:
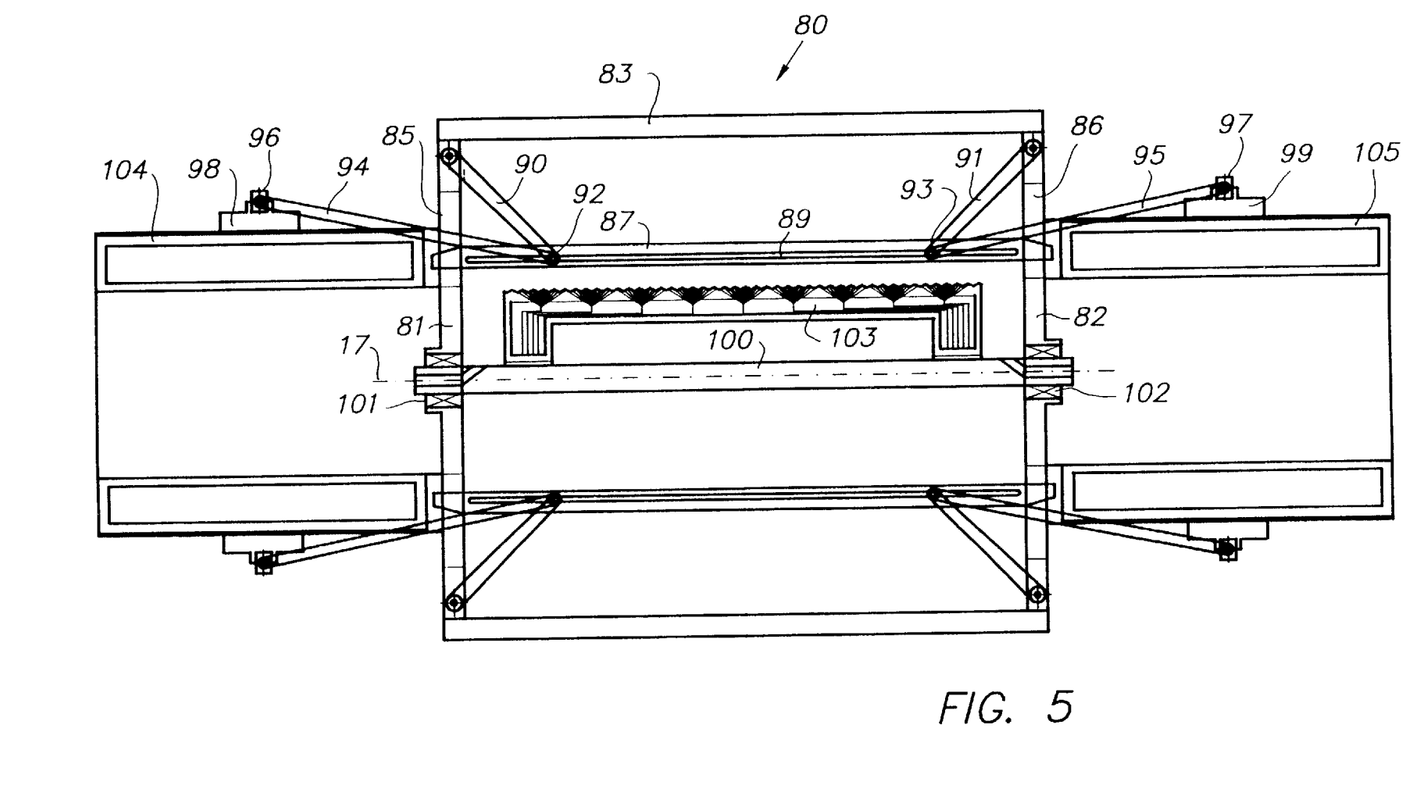
FIG. 5 shows an other embodiment of an adjustable imagesetter according to the invention, provided with an elongate exposure head for the image-wise exposure.

FIG. 5 illustrates another embodiment of a rotating drum imagesetter with adjustable diameter.

Virtual drum 80 is in fact a cage formed by two axially spaced disc-like flanges 81, 82 interconnected by ribs 83. The flanges are rotatably journalled on the stationary shaft 100 of the drum by means of roller bearings 101, 102.

Both flanges have radial grooves 85, 86 guiding the ends of radially displaceable bars 87 having over nearly their complete length a slot 89. Arms 90 and 91 pivotally connected at one end at respective flanges 81 and 82, have their other end slideably connected to groove 89 of bars 87 by means of pins 92, 93. The axial position of the pins is controlled by arms 94, 95 pivotally connected to rings 96, 97 rotatable in a corresponding groove of adjustment sleeves 98, 99 threadably engaging hubs 104, 105 that make part of the corresponding flanges of the drum.

Adjustment of the radial position of bars 87, and thus of the inside diameter of the drum, is obtained by changing the axial position of rings 96, 97 by appropriate rotation of sleeves 98, 99 with respect to the hubs. The arms 94, 95 correspondingly alter the axial position of pins 92, 93 and in consequence the radial position of said pins, and thus of bars 87, is changed.

The exposure of a sheet inside the rotating drum occurs in the present example by means of an exposure head 103 similar to head 37 shown in FIG. 2a.

Figure 6:
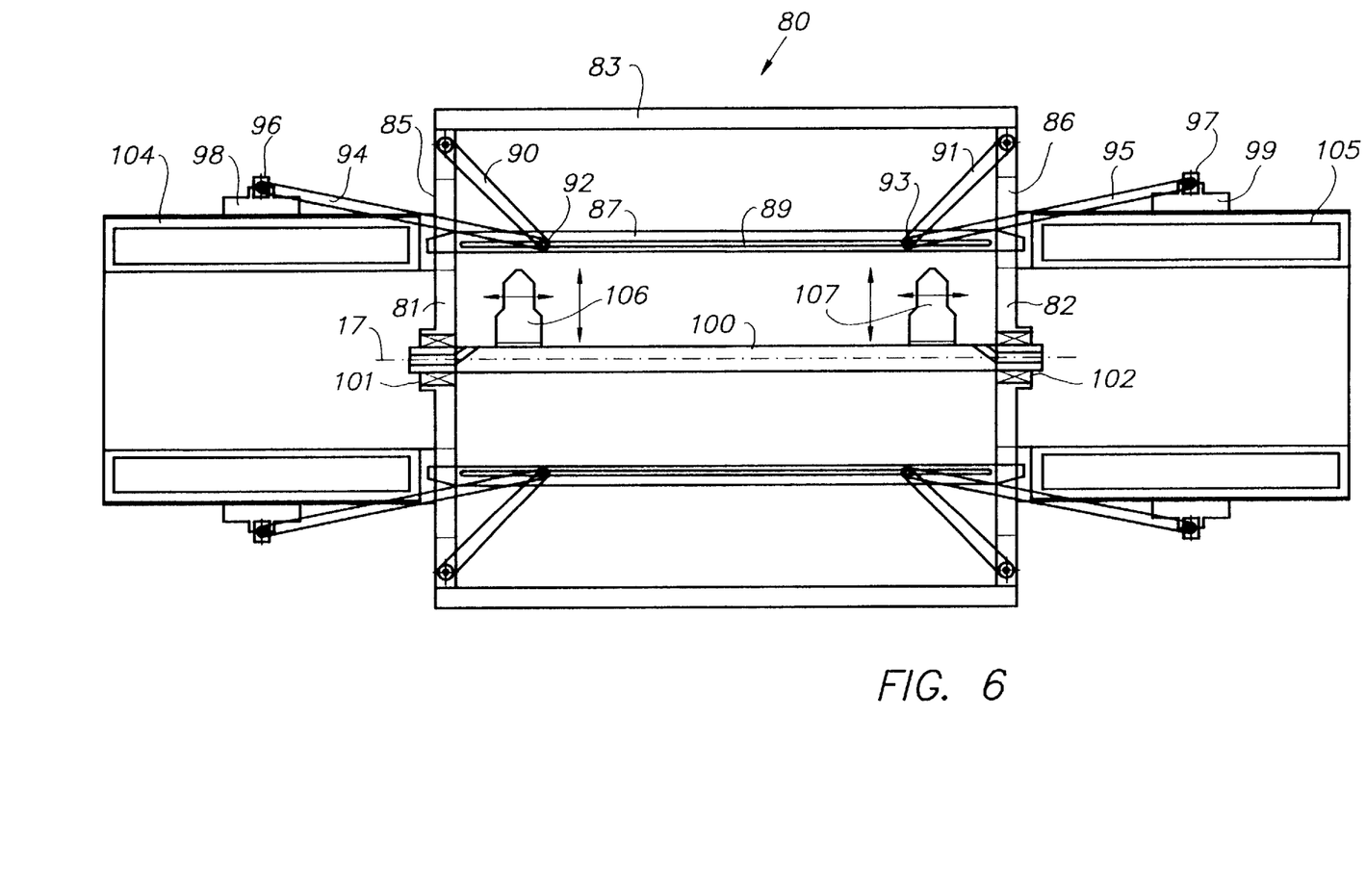
FIG. 6 shows the imagesetter according to FIG. 5, but provided with two separate exposure heads for carrying out the exposure.

FIG. 6 shows a virtual drum imagesetter with variable diameter according to FIG. 5c wherein, however, two writing heads 106, 107 that each either comprise a single radiation source, or an elongated array of sources are provided.

Both exposure heads can either mechanically or electronically be coupled to work together, thereby to cover each half the exposure width of the apparatus. It is clear that three or more exposure heads can be provided working together to provide multi-channel exposure for covering correspondingly smaller widths.

We claim:

1. A rotating drum imagesetter comprising:
   means forming a drum for retaining a flexible sheet of radiation sensitive material in cylindrically curved condition, said drum-forming means being arranged for rotation about a central axis, said drum having an inside surface;
   said drum-forming means being arranged to hold said sheet on said inside surface of said drum;
   means for imagewise exposing said sheet as said sheet is held and rotated by said drum-forming means; and
   said exposure means being arranged inside said drum to carry out internal drum exposure of said sheet while said sheet is rotated by said drum-forming means.

2. A rotating drum imagesetter according to claim 1, wherein said drum-forming means is adjustable to allow different drum diameters to be set.

3. Rotating drum imagesetter according to claim 1, wherein said drum is a virtual drum.

4. A rotating drum imagesetter according to claim 1, wherein said exposure means comprises a linear multi-element radiation array aligned with the axis of the drum and covering a complete exposure width corresponding to a dimension of the sheet which is parallel to the axis of the drum.

5. A rotating drum imagesetter according to claim 1, wherein said exposure means comprises:
   at least one linear multi-element radiation array aligned with the axis of the drum and covering only a portion of a complete exposure width corresponding to a dimension of the sheet which is parallel to the axis of the drum; and
   means for moving said array parallel to the axis of the drum thereby to cover the complete exposure width as the drum rotates.

6. A rotating drum imagesetter according to claim 1, wherein said exposure means comprises:
   a single-element radiation source; and
   means for moving said radiation source parallel to the axis of the drum thereby to cover a complete exposure width corresponding to a dimension of the sheet which is parallel to the axis of the drum.

7. Rotating drum imagesetter according to claim 1, wherein said exposure means comprises at least two writing heads mutually spaced according to the axis of the drum, and means for moving said heads simultaneously and parallel to the drum axis therby to carry out multi-channel recording.

8. Rotating drum imagesetter according to claim 1, wherein said exposure means comprises a laser.

9. Rotating drum imagesetter according to claim 1, wherein said exposure means comprises LED's.

10. Rotating drum imagesetter according to claim 1, which is arranged for optical exposure.

11. Rotating drum imagesetter according to claim 1, which is arranged for heat-mode exposure.

* * * * *